United States Patent [19]
Ihara et al.

[11] Patent Number: 5,753,049
[45] Date of Patent: May 19, 1998

[54] INJECTION APPARATUS WITH THE INTERNAL SPACE CLEANABLE AND METHOD OF CLEANING THE SAME

[75] Inventors: Hirokazu Ihara; Takashi Shimizu, both of Hanishina-gun, Japan

[73] Assignee: Nissei Plastic Industrial Co., Ltd., Nagano-ken, Japan

[21] Appl. No.: 857,870

[22] Filed: May 16, 1997

[30] Foreign Application Priority Data

May 31, 1996 [JP] Japan ................... 8-139178

[51] Int. Cl.⁶ ........................................ B08B 9/00
[52] U.S. Cl. ............... 134/22.1; 134/22.18; 134/31; 134/37; 134/166 R; 100/112
[58] Field of Search ................... 134/22.1, 22.12, 134/22.11, 22.18, 24, 37, 31, 166 R, 169 R; 100/112, 339, 145; 425/226, 227, 378.1; 422/273

[56] References Cited

U.S. PATENT DOCUMENTS 3,700,509  10/1972  Devitt ................... 134/22.1
3,729,177  4/1973   Keyes et al. ........... 134/166 R
5,318,637  6/1994   Wernicke .............. 134/22.11

FOREIGN PATENT DOCUMENTS 62-155073  10/1987  Japan .
5-292933   9/1993   Japan .
95-1275    11/1995  WIPO .

Primary Examiner—Jill Warden
Assistant Examiner—Saeed Chaudhry
Attorney, Agent, or Firm—Weingarten, Schurgin, Gagnebin & Hayes LLP

[57] ABSTRACT

An injection apparatus and method is disclosed that enables the internal space to be cleanable by preventing the solidification of binder through washing and cleaning inside a heating cylinder when molding material formation is completed. An inlet pipe is provided between an inlet of an upper wall at the rear portion of a heating cylinder having a nozzle member at the tip internally equipped with an injection screw and a hopper is installed above the inlet. Pipelines for cleaning water and for compressed air are connected to the inlet pipe. Cleaning inside the heating cylinder is made possible by operating transfer valves provided at these pipelines.

3 Claims, 2 Drawing Sheets

INJECTION APPARATUS WITH THE INTERNAL SPACE CLEANABLE AND METHOD OF CLEANING THE SAME

BACKGROUND OF THE INVENTION

1. Field of the Invention

The present invention relates to an injection apparatus in which the inside of a heating cylinder incorporating an injection screw can be cleaned with cleaning water upon completion of an injection molding operation and to a method of cleaning such an apparatus.

2. Background Art

For sintered products made by injection molding of ceramic powder or metal powder, such as MIM, CIM, or others, an aqueous solution is sometimes used as a binder. This binder tends to easily solidify due to evaporation of its water content. Especially in the case of a binder using agar, the binder commonly solidifies and clogs as a result of the evaporation of the water content of the molding material remaining within the tip of a nozzle merely when injection molding is interrupted. When no preventative measures are taken, injection molding may become impossible after an interruption. To help prevent this, a wet towel is often wrapped around the nozzle member during short rest periods, such as a lunch break at a factory, to lower the temperature and reduce the rate of evaporation of water content from the material remaining inside of the tip portion of the nozzle. Also, if the injection machine is left standing upon completion of an injection molding operation, the binder will solidify, even inside the heating cylinder, and will firmly adhere to inner wall surfaces or screw surfaces where it cannot easily be removed even by overhaul and cleaning. Because of this, currently a machine is disassembled immediately after completing each molding operation, and injection screw, nozzle member, the inside of the cylinder, and other parts are cleaned with warm water to fully remove the molding material.

This cleaning creates extra work for disassembly, cleaning, and assembly upon completion of each molding operation in the injection molding of sintered products such as MIM, CIM, and the like. Moreover, the cleaning work must be carried out within a limited time period before the binder begins to harden, as the removal of firmly stuck binder is difficult even by overhaul and cleaning.

SUMMARY OF THE INVENTION

The present invention has been conceived to solve the problems in the conventional art described above, and its object is to provide an injection apparatus the inside of which can be cleaned with cleaning water and also a method of cleaning the inside of said apparatus. Partial binder residue is prevented and moisture is fully removed from the cylinder after cleaning.

The injection apparatus of the present invention with the object as explained above comprises a heating cylinder having a nozzle member at its tip and internally an injection screw, an inlet in the upper wall at the rear portion of the heating cylinder, an inlet pipe located in a material passage between said inlet and a hopper placed above said inlet, pipelines for cleaning water and for compressed air connected to said inlet pipe, and transfer valves connected to these pipes, by which cleaning inside the heating cylinder is made possible.

With this configuration, cleaning of the inside of the heating cylinder can be accomplished by filling the cavity with cleaning water and then forcing compressed air through it, thereby eliminating the necessity of conventional disassembly and cleaning and permitting the internal cleaning by the valve operations without requiring a complicated construction in the vicinity of the material passage because a single inlet pipe arranged at the material passage can be used for both cleaning water and compressed air. Cleaning work can therefore be performed very easily upon completion of a molding operation.

Also, according to the internal cleaning method of the present invention an inlet pipe is provided in the material passage between the inlet in the upper wall at the rear portion of the heating cylinder and the hopper above said inlet. The opening of material passage at the hopper side is closed airtight upon completion of molding, the heating cylinder is filled with cleaning water from the inlet pipe, the injection screw inside the heating cylinder is rotated and cleaning water is discharged from the tip side of the heating cylinder, and at the same time forward and backward movement of the injection screw is repeated for a number of times required to wash the inside of the heating cylinder. Compression is then switched from the cleaning water to compressed air and water content in the heating cylinder is blown off from the tip side, thereby air-drying the inside of the heating cylinder. In some cases, the filling of cleaning water and compressed air can be performed at the same time, and cleaning can also be performed simultaneously with agitation of the inside of the heating cylinder.

These and other objects, features, and advantages of the present invention will become clear from the following description of the preferred embodiment taken in conjunction with the accompanying drawings.

BRIEF DESCRIPTION OF THE DRAWINGS

The above and other objects, features and advantages of the present invention will become more apparent from the following description of the preferred embodiment thereof taken conjunction with the accompanying drawings, in which like reference numerals denote like elements, and in which.

DETAILED DESCRIPTION OF THE PREFERRED EMBODIMENTS

Figure 1:
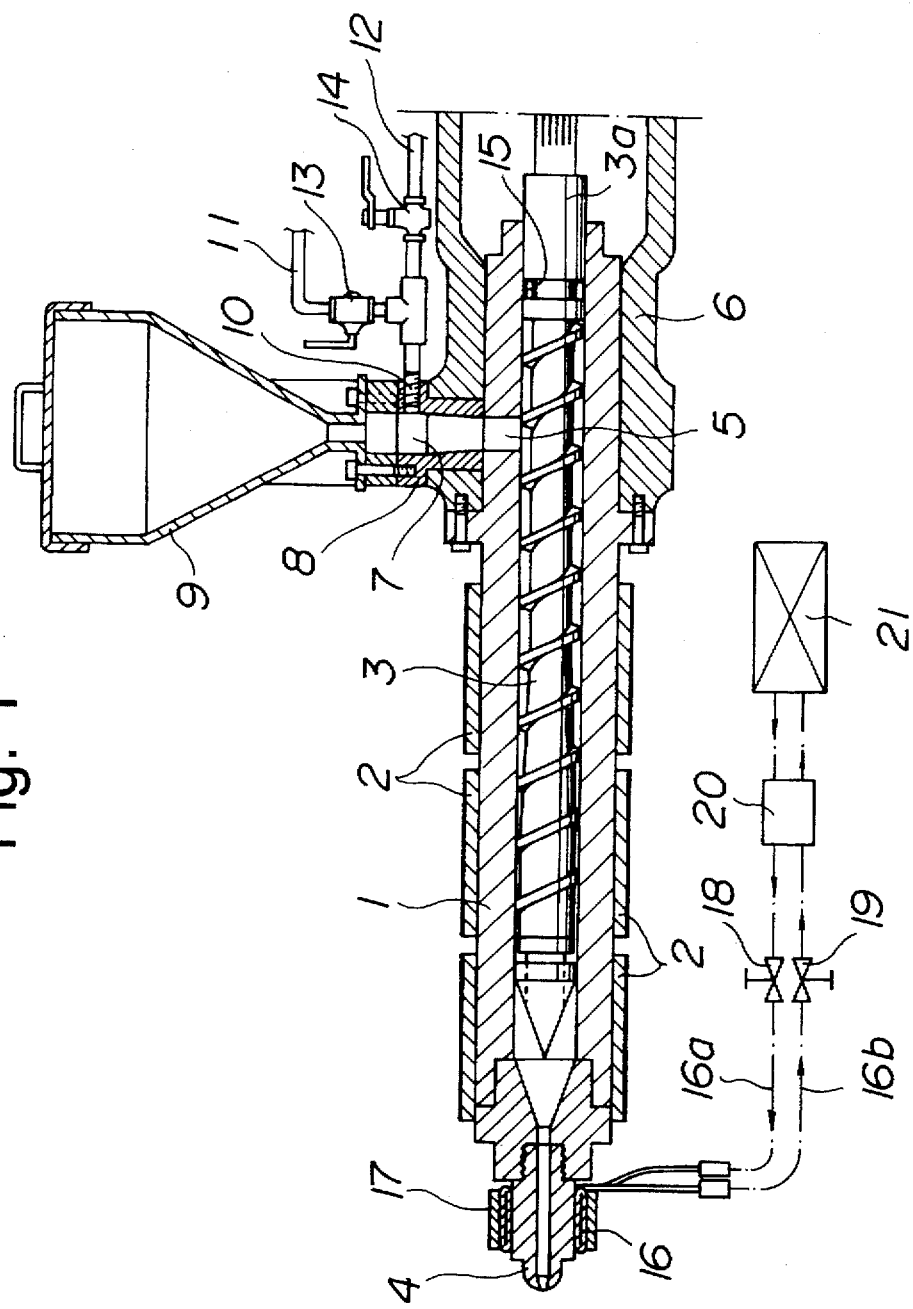
FIG. 1 shows a longitudinal cross section of the injection apparatus with the internal space cleanable according to the present invention.

The preferred embodiment of the injection apparatus according to the present invention will be described herein under with reference to the accompanying drawings. Referring first to FIG. 1, a heating cylinder 1 has a required number of band heaters 2 around its outer periphery and is internally equipped with an injection screw 3 in a freely movable back and forth manner. A nozzle member 4 is attached to the tip of the heating cylinder 1, and a supply inlet 5 has been drilled in an upper wall at the rear of said and heater 2.

A rear end portion including the inlet 5 of said heating cylinder 1 is inserted to and supported by a cylindrical member 6 extended to the front end portion of an injection cylinder (not shown in the drawing) and is connected in one united body with the injection cylinder using bolts or the like. Also, the tip portion of the supporting member 6 is longitudinally fitted with a sleeve 8 through which the material passage 7 is connected to said supply inlet 5, and a hopper 9 for molding material is located above said sleeve.

This hopper 9 is bolted or otherwise attached in a freely detachable manner to the sleeve 8, while an inlet pipe is provided through the wall portion of the sleeve 8 in 10 said material passage 7 between the inlet 5 and the hopper 9. A cleaning water pipeline 11 and a compressed air pipeline 12 are connected to this inlet pipe 10 with respective transfer valves 13 and 14.

A seal ring 15, in a form such as an O-ring or U-packing, is provided and fitted in a ring-shaped groove in the outer periphery of a rear end portion 3a of said injection screw 3 for keeping the rear opening of the heating cylinder 1 airtight. In addition, a jacket 16 is provided for cooling water on the outer periphery of said nozzle member 4, and a band heater 17 is attached by overlapping on said jacket 16.

In-out passages 16a and 16b of said jacket 16 are connected to a relay block 20 attached to a bed (not shown in the drawing) of the injection apparatus by providing transfer valves 18 and 19 and are further connected to a cooler unit 21, and cooling water is supplied to the jacket 16 from the cooler unit 21 only when molding is interrupted for a short period. The cooling water at the jacket 16 lowers the temperature of the nozzle member 4 due to the band heater 17, thereby suppressing the evaporation of the moisture of molding material inside the nozzle tip and preventing the hardening of the material.

Next, an internal cleaning method for said injection apparatus will be explained.

Figure 2:
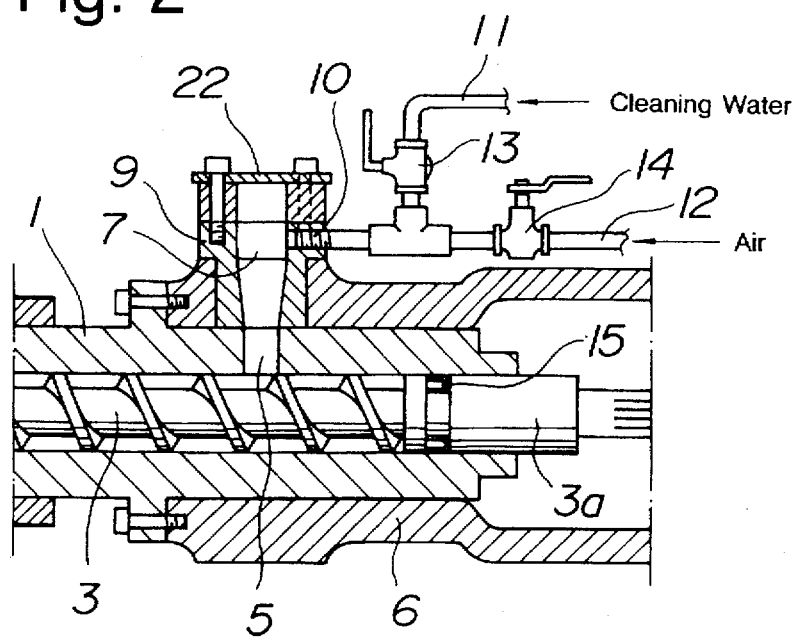
FIG. 2 is a longitudinal cross section of the rear portion of the heating cylinder at the time of internal cleaning.
Figure 3:
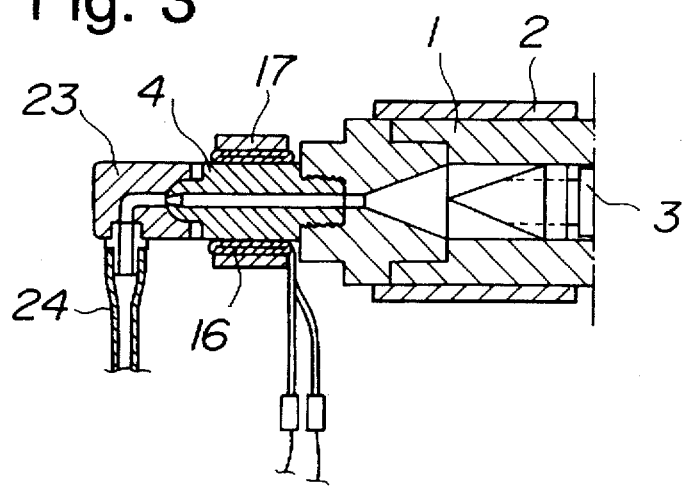
FIG. 3 is a longitudinal cross section of the front portion of the heating cylinder of the present invention.

Materials are purged off upon completion of the molding work, and residual materials are removed from the inside of the cylinder. This purging alone is unable to completely remove the residual materials from the screw grooves. Therefore, the hopper 9 is removed and, as shown in FIG. 2, the opening of the material passage 7 is closed with a watertight lid 22 having a seal ring at its rear side. Also, a discharge attachment 23 is attached to the tip of said nozzle member 4, and a tube 24 is connected to it for discharging the cleaning water to a drain through the tube as shown in FIG. 3. In this case, the cylinder temperature is made as same as that at the time of molding.

Figure 4:
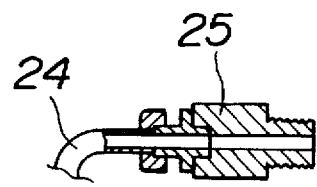
FIG. 4 is a longitudinal cross section of another embodiment of a discharge attachment.

The attachment 25 shown in FIG. 4 is of a type which permits screwing to the tip of the heating cylinder 1 by removing the nozzle member 4 and is used for specially cleaning the inside o f the nozzle member 4. The cleaning water is discharged to the drain by the tube 24 as in the case of the attachment 23 described above.

When the preparation described above has been completed, the transfer valve 13 of the pipeline 11 is opened, and cleaning water is filled from the inlet pipe 10 to the inside of the heating cylinder 1 through the material passage 7 and the inlet 5 under a required pressure. The injection screw 3 is also rotated after water filling. In this way, residual materials in the screw groove are pushed out the cylinder tip. Moreover, if the injection screw 3 is moved back and forth, the residual material can be discharged from the nozzle member 4 and attachment 23 to the drain together with the cleaning water.

If the screw rotation and the back and forth movement are repeated under such water filling, the residual materials can be fully washed away in approximately 5 minutes, leaving the inside of the heating cylinder completely cleaned. However, moisture from the cleaning water remains inside the heating cylinder, so the transfer valve 13 of the pipeline 11 is closed and the filling of cleaning water is discontinued. The transfer valve 14 of the pipeline 12 is opened, and compressed air is pressed into the inner portion of the heating cylinder 1 through the material passage 7 and the inlet 5. In this case, said attachment 23 may be left as it is or removed.

By forcing compressed air through the space, the residual water and residual binder stuck to the inner wall surfaces of the heating cylinder 1 and the screw surfaces will be removed and blown out of the nozzle member 4 to the attachment 23. Moreover, the inside of the cylinder is air-dried and left in a dry state without residual moisture, even after cleaning with water.

Upon completion of cleaning, the injection molding operation can be restarted merely by removing the attachment 23 from the nozzle member 4 and removing said watertight lid 22 and attaching it to the hopper 9.

Cleaning may be enhanced by simultaneously injecting both cleaning water and compressed air into the cylinder. This injection can be performed by operating said transfer valves 12 and 13. The cleaning water is vigorously agitated by the air pressure inside the cylinder and the cleaning effect is enhanced over the case where only the cleaning water is used. If the injection of cleaning water is stopped before the compressed air is stopped, then the cleaning operation is transferred to drying using only the compressed air.

Though the watertight lid 22 is used as airtight sealing means for the material passage 7 in said preferred embodiment, the hopper 9 may also be used as is without removing if a shutter is installed to the hopper 9 capable of maintaining an airtight condition for the material passage 7.

What is claimed is:

1. An injection apparatus with the internal space cleanable comprising:

a heating cylinder having a nozzle member at the tip thereof and internally an injection screw;

an inlet in the upper wall at the rear portion of the heating cylinder;

an inlet pipe provided in a material passage between said inlet and a hopper placed above said inlet;

pipelines for cleaning water and for compressed air connected to said inlet pipe; and transfer valves connected to these pipes, by which cleaning inside the heating cylinder is made possible.

2. An internal cleaning method of an injection apparatus comprising: a heating cylinder having a nozzle member at the tip thereof and internally an injection screw; an inlet in the upper wall at the rear portion of the heating cylinder; an inlet pipe provided in a material passage between said inlet and a hopper placed above said inlet; pipelines for cleaning water and for compressed air connected to said inlet pipe; and transfer valves connected to these pipes, by which cleaning inside the heating cylinder is made possible, said method comprising the steps of:

sealing in an airtight manner the opening of said material passage at the hopper side upon completion of molding;

filling cleaning water from said inlet pipe to the heating cylinder;

rotating an injection screw inside the heating cylinder;

discharging the cleaning water from the tip side of said heating cylinder;

repeating the back and forth motions of the injection screw a required number of times; and switching the filling to compressed air to blow off the moisture content from the inside of the heating cylinder and air-dry the inside of the heating cylinder.

3. The internal cleaning method of an injection apparatus as defined in claim 2, wherein the filling of said compressed air is carried out at the same time with that of the cleaning water.

* * * * *

UNITED STATES PATENT AND TRADEMARK OFFICE
CERTIFICATE OF CORRECTION

PATENT NO. : 5,753,049
DATED : May 19, 1998
INVENTOR(S) : Hirokazu Ihara, et al.

It is certified that error appears in the above-identified patent and that said Letters Patent is hereby corrected as shown below:

Column 3, line 2, "an inlet pipe is" should read --an inlet pipe 10 is--.

Column 3, line 3, "the sleeve 8 in 10 said" should read --the sleeve 8 in said--.

Signed and Sealed this

Eighth Day of December, 1998

Attest:

BRUCE LEHMAN

Attesting Officer

Commissioner of Patents and Trademarks